United States Patent
Kana et al.

(10) Patent No.: US 10,760,911 B2
(45) Date of Patent: Sep. 1, 2020

(54) INTEGRITY MONITORING METHOD FOR NAVIGATION SYSTEMS WITH HETEROGENEOUS MEASUREMENTS

(71) Applicant: Honeywell International Inc., Morris Plains, NJ (US)

(72) Inventors: Zdenek Kana, Dubnany (CZ); Jindrich Dunik, Plzen (CZ); Milos Sotak, Slavkov u Brna (CZ); Radek Baranek, Litovel (CZ)

(73) Assignee: Honeywell International Inc., Morris Plains, NJ (US)

( * ) Notice: Subject to any disclaimer, the term of this patent is extended or adjusted under 35 U.S.C. 154(b) by 175 days.

(21) Appl. No.: 15/473,494

(22) Filed: Mar. 29, 2017

(65) Prior Publication Data
US 2018/0283871 A1 Oct. 4, 2018

(51) Int. Cl.
*G01C 21/00* (2006.01)
*G01C 21/16* (2006.01)
(Continued)

(52) U.S. Cl.
CPC ......... *G01C 21/005* (2013.01); *G01C 21/165* (2013.01); *G01C 21/20* (2013.01);
(Continued)

(58) Field of Classification Search
CPC .... G01C 21/005; G01C 21/165; G01C 21/20; G01C 23/00; G01C 25/005; G01C 25/00; G06N 7/005; G06N 7/00; G01S 19/20; G01S 19/47
See application file for complete search history.

(56) References Cited

U.S. PATENT DOCUMENTS 6,204,806 B1 * 3/2001 Hoech ............... G01S 19/20
342/357.58
7,248,964 B2 7/2007 Bye
(Continued)

FOREIGN PATENT DOCUMENTS

EP 3260877 A2 12/2017

OTHER PUBLICATIONS

European Patent Office, "Extended European Search Report from EP Application No. 18163208.4 dated Aug. 10, 2018", "from Foreign Counterpart of U.S. Appl. No. 15/473,494", dated Aug. 10, 2018, p. 1-8, Published in: EP.
(Continued)

*Primary Examiner* — Jeffrey C Boomer
(74) *Attorney, Agent, or Firm* — Fogg & Powers LLC

(57) ABSTRACT

An integrity monitoring method for navigation systems with heterogeneous measurements is provided. Measurements from a plurality of different type navigation aiding sources are categorized by an information domain, an aiding class and an aiding section. The information domain is a category of at least one of estimated states and measurements that represent a same physical category. The aiding class is a category that uses a same physical method to acquire measurements. The aiding section is a category of measurements from the same aiding source. The measurements are organized into a plurality of measurement clusters based at least in part on measurement fault modes to be detected, measurement fault modes to be excluded, available computer resources and required performance. An integrity monitoring algorithm is applied to the measurement clusters to determine an integrity solution for all defined integrity monitoring classes.

17 Claims, 7 Drawing Sheets

(51) Int. Cl.
| | | |
|---|---|---|
| G01S 19/20 | (2010.01) | |
| G01S 19/47 | (2010.01) | |
| G01C 21/20 | (2006.01) | |
| G06N 7/00 | (2006.01) | |
| G01C 23/00 | (2006.01) | |

(52) U.S. Cl.
CPC .............. *G01S 19/20* (2013.01); *G01S 19/47* (2013.01); *G06N 7/005* (2013.01); *G01C 23/00* (2013.01)

(56) References Cited

U.S. PATENT DOCUMENTS

| | | | | |
|---|---|---|---|---|
| 2008/0169978 | A1* | 7/2008 | Powell | G01S 19/01 342/357.22 |
| 2010/0265132 | A1* | 10/2010 | Oehler | G01S 19/20 342/357.58 |
| 2014/0074397 | A1 | 3/2014 | Vanderwerf | |
| 2014/0232595 | A1* | 8/2014 | Rife | G01S 19/20 342/357.58 |
| 2014/0292574 | A1 | 10/2014 | Dunik et al. | |
| 2015/0032300 | A1* | 1/2015 | Arethens | G01S 19/45 701/17 |
| 2015/0145724 | A1 | 5/2015 | Kana et al. | |
| 2015/0362598 | A1* | 12/2015 | Rollet | G01S 19/15 701/17 |
| 2016/0154110 | A1* | 6/2016 | Destelle | G01S 19/20 342/357.58 |

OTHER PUBLICATIONS

Brenner, Mats, "Integrated GPS/Intertial Fault Detection Availability", "Navigation: Journal of the Institute of Navigation", Mar. 1996, pp. 339-358, vol. 43, No. 2, Publisher: Institute of Navigation, Published in: US.

GNSS Evolutionary Architecture Study Panel, "Phase II of the GNSS Evolutionary Architecture Study", "GNSS Evolutionary Architecture Study Phase II Report", Feb. 2010, pp. 1-122.

Alan Genz, "Numerical Computation of Multivariate Normal Probabilities", "Revised version in J. Comp. Graph Stat. 1 (1992), pp. 141-149", , pp. 1-7, Publisher: Department of Pure and Applied Mathmatics.

Lee, "Investigation of Extending Receiver Autonomous Integrity Monitoring (RAIM) to Combined Use of Galileo and Modernized GPS", "ION GNSS 17th International Technical Meeting of the Satellite Division, Sep. 21-24, 2004", Sep. 1, 2004, pp. 1691-1698, Publisher: The Mitre Corporation, Published in: Long Beach, CA.

Young et al., "Fault Detection and Exclusion Using Normalized Solution Separation and Residual Monitoring Methods", "Journal of the Institute of Navigation", Dec. 2002, pp. 151-169, vol. 50, No. 3, Publisher: Rockwell Collins, Inc., Published in: Cedar Rapids, Iowa.

Skog et al., "In-Car Positioning and Navigation Technologies—A Survey", "IEEE Transactions on Intelligent Transportation Systems", Mar. 2009, pp. 4-21, vol. 10, No. 1.

Sukkarieh, "Low Cost, High Integrity, Aided Inertial Navigation Systems for Autonomous Land Vehicles", "A thesis submitted in fulfillment of the requirements for the degree of Doctor of Philosophy", Mar. 2000, pp. i-192, Publisher: Dept. of Mechanical Engineering and Mechatronic Engineering, The University of Sydney, Published in: Sydney, Australia.

European Patent Office, "Communication under Rule 71(3) from EP Application No. 18163208.4 dated Mar. 28, 2019", from Foreign Counterpart to U.S. Appl. No. 15/473,494, pp. 1-36, Published: EP.

* cited by examiner

INTEGRITY MONITORING METHOD FOR NAVIGATION SYSTEMS WITH HETEROGENEOUS MEASUREMENTS

BACKGROUND

As the navigation technology evolves, there is an effort to hybridize navigation information provided from different navigation information producing sources into a single navigation solution (typically covering position, velocity, and altitude/heading). Example navigation information producing sources may include an inertial measurement unit (IMU), a global navigation satellite system (GNSS), a magnetometer, air-data, distance measuring equipment (DME), eLoran, odometers, radar-altimeter, maps, vision sensors, etc. The hybridizing of the different navigational information sources introduces the need for a technique which assures the integrity of this complex single navigation solution. Current integrity monitoring algorithms focus mainly on particular navigation parameters (mostly position) of the snap-shot GNSS or hybridized GNSS/INS systems without any regard to other navigation parameters. This however, is an approach not suitable for aiding sources with heterogeneous measurements.

For the reasons stated above and for other reasons stated below which will become apparent to those skilled in the art upon reading and understanding the present specification, there is a need in the art for an integrity monitoring technique of the navigation information provided by a navigation algorithm solution integrating complex and heterogeneous aiding sources.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In embodiments, an integrity monitoring algorithm is applied to measurement clusters instead of the measurements themselves.

In one embodiment, an integrity monitoring method for navigation systems with heterogeneous measurements is provided. The method includes defining integrity monitoring classes specifying quantities of a navigation information to be protected. Measurements from a plurality of different type navigation aiding sources are received. The measurements are categorized by an information domain, an aiding class and an aiding section. The information domain is a category of at least one of estimated states and measurements that represent a same physical category. The aiding class is a category that uses a same physical method to acquire measurements. The aiding section is a category of measurements from the same aiding source. The measurements are organized into a plurality of measurement clusters based at least in part on measurement fault modes to be detected, measurement fault modes to be excluded, available computer resources and required performance. An integrity monitoring algorithm is applied to the measurement clusters to determine an integrity solution for all defined integrity monitoring classes.

In another embodiment, a program product for implementing an integrity monitoring for navigation systems with heterogeneous measurements is provided. The program product comprising a processor-readable medium on which program instructions are embodied, wherein the program instructions are operable, when executed by at least one processor in a navigation system, to cause the navigation system to; categorize received measurements from a plurality of different type navigation aiding sources by an information domain, an aiding class and an aiding section, wherein the information domain is a category of at least one of estimated states and measurements that represent a same physical category, wherein the aiding class is a category that uses a same physical method to acquire measurements, wherein the aiding section is a category of measurements from the same aiding source; organize the measurements into a plurality of measurement clusters based at least in part on measurement fault modes to be detected, measurement fault modes to be excluded, available computer resources and required performance; and apply an integrity monitoring algorithm to the measurement clusters to determine an integrity solution for all defined integrity monitoring classes.

In yet another embodiment, a system having an integrity monitoring function for heterogeneous measurements is provided. The system includes at least one input, at least one memory and at least one controller. The at least one input receives navigation related measurement information from a plurality of different sources. The at least one memory is used to store at least one filter and at least one integrity function. The at least one controller is in communication with the at least one input and the at least one memory. The at least one controller is configured to execute the at least one filter and at least one integrity function in processing the received navigation related measurement information from the plurality of different sources to determine the integrity of the received related measurement navigation information. The controller, based on the execution of the at least one filter, is configured to categorize measurements from the navigation related measurement information by an information domain, an aiding class and an aiding section. The information domain is a category of at least one of estimated states and measurements that represent a same physical category. The aiding class is a category that uses a same physical method to acquire measurements. The aiding section is a category of measurements from the same aiding source. The at least one controller is further, based on the execution of the at least one filter, configured to organize the measurements into a plurality of measurement clusters based at least in part on measurement fault modes to be detected, measurement fault modes to be excluded, available computer resources and required performance. The at least one controller, based on the execution of the at least one integrity function, is configured to apply an integrity monitoring algorithm to the measurement clusters to determine an integrity solution for all defined integrity monitoring classes.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a system and methodology of integrity monitoring of navigation information estimated by a statistical filter on the basis of a mathematical model and heterogeneous measurements. The method provides a general framework for the integrity monitoring of any navigation system where the computational complexity and achievable performance of the results can be adjusted according to the user requirements. In embodiments using a centralized hybridization architecture (all sensors/units/systems from the set of aiding measurements fused in a single statistical filter), all the aiding measurements are distributed among multiple clusters as discussed below in detail. In embodiments, the design of the clusters are used to account for different fault modes that should be detected (i.e. single GPS satellite failure, Galileo constellation failure, single wheel odometer failure) taking into consideration requirements on the fault detection ability, exclusion availability and computational demands. As a core algorithm, a solution separation methodology is used that forms sub-solution, sub-sub-solution, etc. based on the measurement clusters, instead of satellite measurements like in "classical" solution separation. The centralized filter hybridization also assures the integrity for all domain constraints only by the states estimated within the statistical filter. This approach enables fairly straightforward approach to gain an optimal performance from the multiple navigation sensors/unit/systems (centralized) hybridization, while maintaining required safety/integrity and reasonable computational demands.

Figure 1:
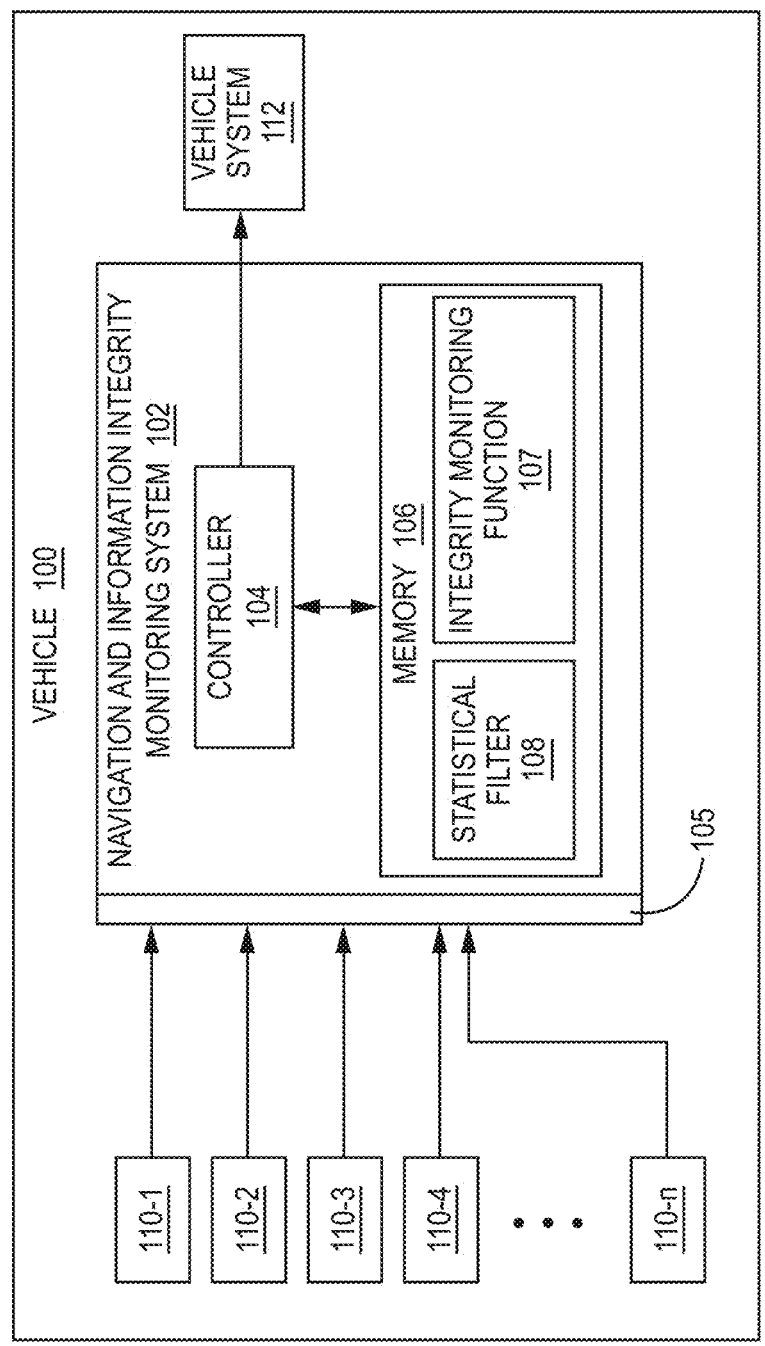
FIG. 1 illustrates a vehicle of an embodiment having an integrity monitoring navigation system.

An example of a vehicle 100 implementing embodiments is illustrated in the FIG. 1. The vehicle includes a navigation and information integrity monitoring system 102, a plurality of navigation related measurement information sources 110-1 through 110-$n$ and a vehicle system 112. The plurality of navigation related measurement information sources 110-1 through 110-$n$ may include, but are not limited to, an inertial measurement unit (IMU), a global navigation satellite system (GNSS), a magnetometer, air-data, distance measurement equipment (DME), eLoran, odometers, a radar-altimeter, maps, vision sensors, etc. The navigation related measurement information sources 110-1 through 110-$n$ are generally designated as 110 here forth. Navigation related measurement information of the navigation related measurement information sources 110 are provided to at least one input 105 of the navigation and information integrity monitoring system 102 in this example embodiment. The navigation and information integrity monitoring system 102 includes a controller 104 and a memory 106. In embodiments the navigation system with assured integrity 102 further includes a statistical filter 108 and an integrity monitoring function 107. In an embodiment, the filter 108 is a statistical filter that is stored in the memory 106 that is executed on the navigation related measurements information of the navigation related measurement information sources 110 by the controller 104 to organize information outputs into clusters as discussed in detail below. Further in an embodiment, the integrity monitoring function 107 is stored in memory 106 and implemented by the controller 104. The integrity monitoring function 107 includes an integrity monitoring algorithm used to determine a set of solutions such as a full solution and sub-solutions as discussed below in detail. In an embodiment, the controller 104 after processing the navigation related measurement information of the navigation related measurement information sources 110 with the statistical filter 108 and integrity monitoring function 107 provides navigation information to the vehicle system 112. The vehicle system 112, in an embodiment, is a vehicle control that in turn uses the navigation information from the navigation and information integrity monitoring system 102 to at least in part control directional operations of the vehicle 100. Moreover, in other embodiments, the vehicle system 112 may include at least one of a surveillance system, a display system, a management system and like systems.

In general, the controller 104 may include any one or more of a processor, microprocessor, a digital signal processor (DSP), an application specific integrated circuit (ASIC), a field program gate array (FPGA), or equivalent discrete or integrated logic circuitry. In some example embodiments, controller 104 may include multiple components, such as any combination of one or more microprocessors, one or more controllers, one or more DSPs, one or more ASICs, one or more FPGAs, as well as other discrete or integrated logic circuitry. The functions attributed to the controller 104 (such as the statistical filter and integrity monitoring functions) herein may be embodied as software, firmware, hardware or any combination thereof. The controller 104 may be part of a system controller or a component controller. The memory 106 may include computer-readable operating instructions that, when executed by the controller 104 provides functions of the navigation and information integrity monitoring system 102. Such functions may include the functions of statistical filter 108 and integrity monitoring function 107 described below. The computer readable instructions may be encoded within the memory 106. Memory 106 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other single or multiple storage medium.

Figure 2:
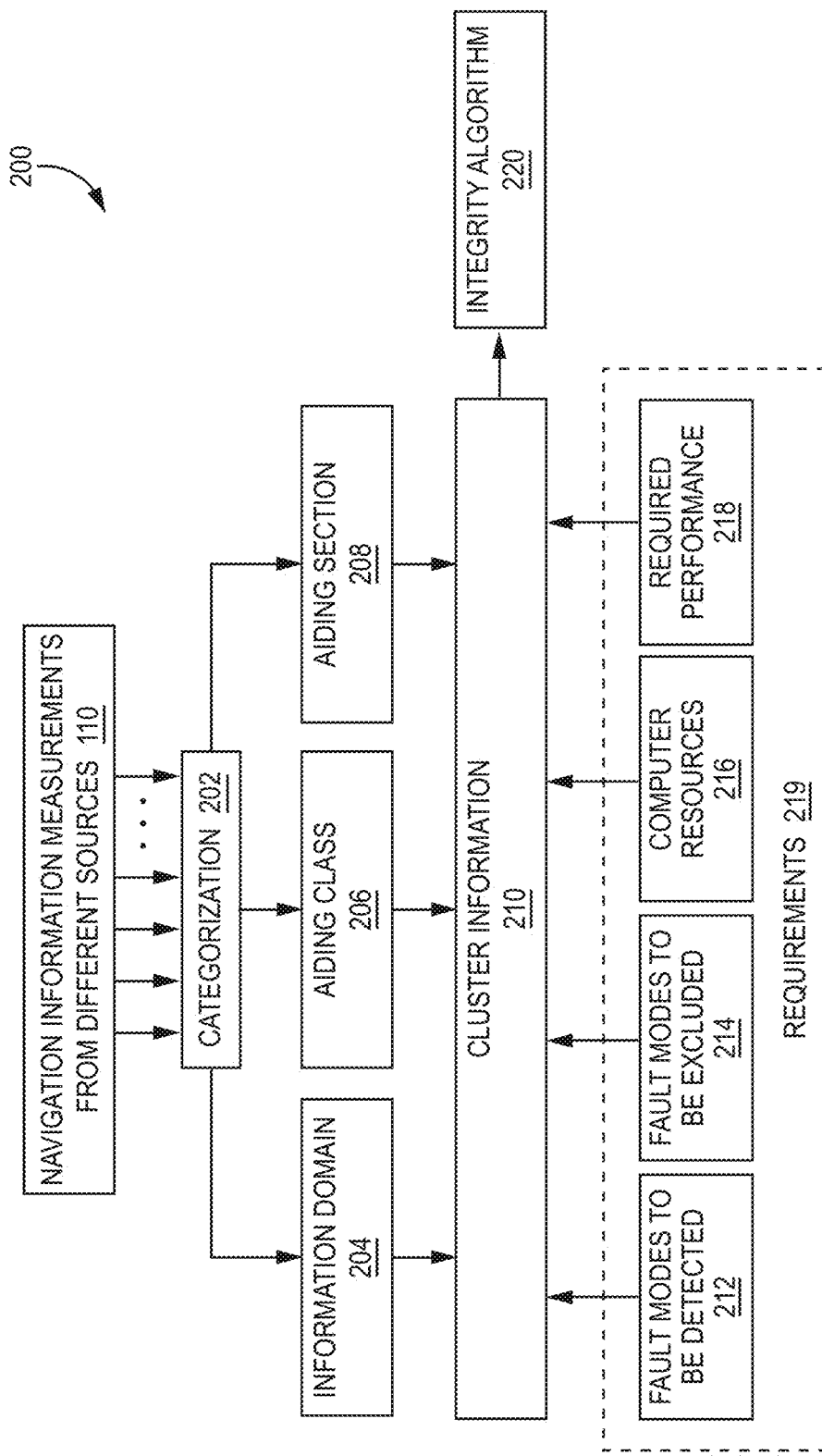
FIG. 2 illustrates a general process flow diagram of an embodiment.

A general process flow diagram 200 of an embodiment is illustrated in FIG. 2. As illustrated, the process starts by taking the navigation related measurement information from the navigation related measurement information sources 110 and categorizing 202 the received navigation related measurement information based on three characteristics in this example embodiment. The categories in this example include an information domain 204, an aiding class 206 and an aiding section 208. The characteristics associated with the information domain 204 includes states and/or measurements which represent the same physical quantity. For example, the information domain 204 may include position, velocity, attitude/heading, etc. The information in the information domain may be represented by a vector of primary states having many different measurements defined for it. The characteristics associated with the aiding class 206 relate to measurements for which the same physical method was used to acquire the information. An example of the characteristics of the aiding class include RF satellite ranging and RF terrestrial ranging. The characteristics associated with the aiding section 208 relate to measurements taken from the same aiding source. An example of the characteristics of the aiding section 208 are GPS PR measurements or Galileo PR measurements.

Once the measurements are sorted by characteristics, the measurements are further organized into measurement clusters 210. In an example embodiment, the clusters are organized according to requirements 219 of an embodiment that includes the fault modes that are to be detected 212, fault modes that are to be excluded 214, the available computer resources 216 that are included, and required performance 218 in terms of integrity, accuracy, availability, and continuity for each integrity monitoring class. In embodiments, an integrity monitoring algorithm 220 is applied to the measurement clusters instead of the measurements themselves. Cluster formation may follow the following rules; all measurements in one cluster are typically from the same information domain and a cluster can include measurements from different aiding sections and from different aiding classes. If exclusion capability is required (another layer of solutions is to be added) but the set of fault modes to be excluded is smaller than the ones to be detected, selection exclusion (lowest) layer solution(s) can form virtual clusters(s), too. This extends the set of fault modes to be detected (but not excluded).

Figure 3A:
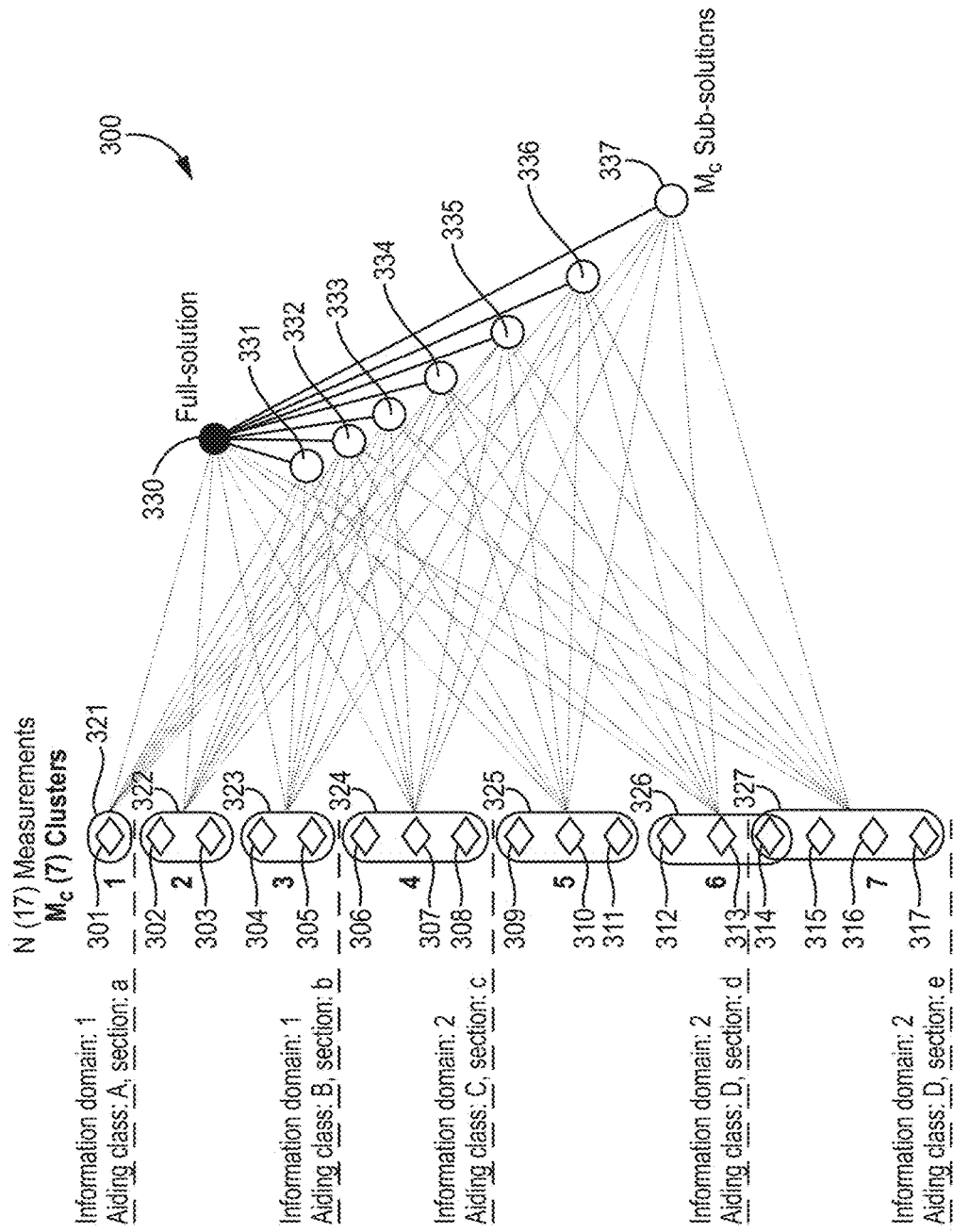
FIG. 3A illustrates a formation of first layer solutions of an embodiment.

Referring to FIG. 3A, an example of a solution formation of first layer 300 is provided. In this example embodiment, there are 17 measurements 301 through 317 provided by navigation information sources 110 that are categorized and clustered into 7 clusters 321 through 327. The first cluster 321 includes measurement 301 that was categorized in information domain 1, aiding class A and aiding section a. The second cluster 322 includes measurements 302 and 303 that were categorized in information domain 1, aiding class B and aiding section b. The third cluster 323 includes measurements 304 and 305 that were also categorized in information domain 1, aiding class B and aiding section b. The fourth cluster 324 includes measurements 306, 307 and 308 that were categorized in information domain 2, aiding class C and aiding section c. The fifth cluster 325 includes measurements 309, 310 and 311 that were categorized in information domain 2, aiding class D and aiding section d. The sixth cluster 326 includes measurements 312, 313 and 314. Measurements 312 and 313 were also categorized in information domain 2, aiding class D and aiding section d while measurement 314 is categorized in information domain 2, aiding class D and aiding section e. The seventh cluster 327 includes measurements 314, 315, 316 and 317. Measurements 314, 315, 316 and 317 are all categorized in information domain 2, aiding class D and aiding section e. Hence, as illustrated in this example, cluster groups may share a measurement (i.e. measurement 314 of cluster groups 326 and 327).

Figure 3B:
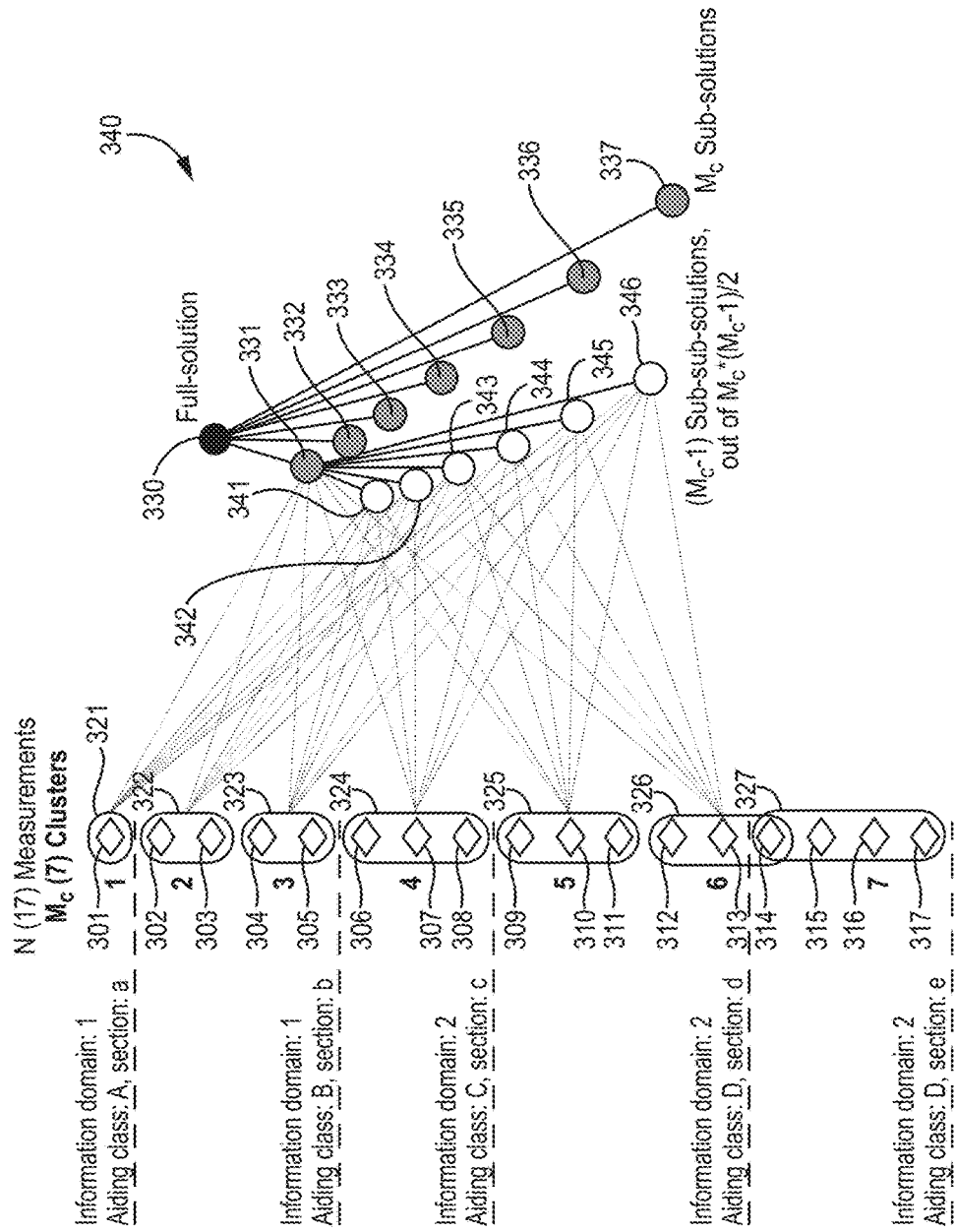
FIG. 3B illustrates a formation of layer solutions of an embodiment.
Figure 3C:
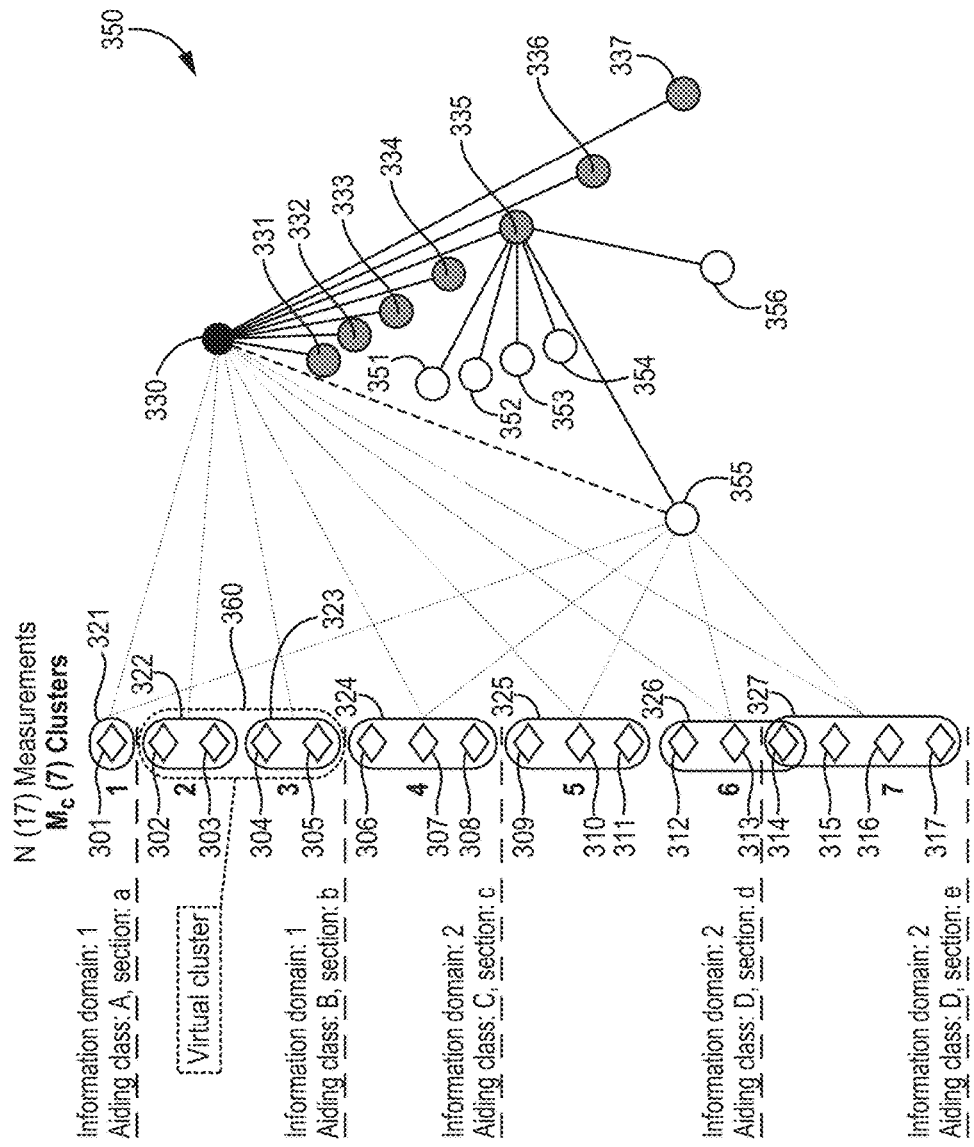
FIG. 3C illustrates the use of a virtual clusters of an embodiment.

The solution formation of first layer 300 example of FIG. 3A includes a full solution 330. The full solution 330 processes all of the measurement clusters 321 through 327. The solution formation of first layer 300 example also includes seven sub-solutions 331 through 337. The sub-solution process each measurement cluster minus one cluster. A lowest layer solution formation 340 in an example embodiment is illustrated in FIG. 3B. In this example, six sub-sub-solutions 341 through 346 off of sub-solution 331 is illustrated. Further FIG. 3C illustrates a solution 350 with the use of virtual cluster 360. The virtual cluster 360 in this example includes measurements 302, 303, 304 and 305. As discussed above, if exclusion capability is required (another layer of solutions is to be added) but the set of fault modes to be excluded is smaller than the ones to be detected, selection exclusion (lowest) layer solution(s) can form virtual clusters(s). This extends the set of fault modes to be detected (but not excluded). The solution 350 further illustrates sub-sub-solutions 351 through 356 of sub-solution 335. Also illustrated in the example of FIG. 3C is that sub-sub-solution 355 represents the virtual cluster related sub-sub-solution, where an additional statistic with respect to full solution 330 to be processed by the fault detection is constructed.

Figure 4:
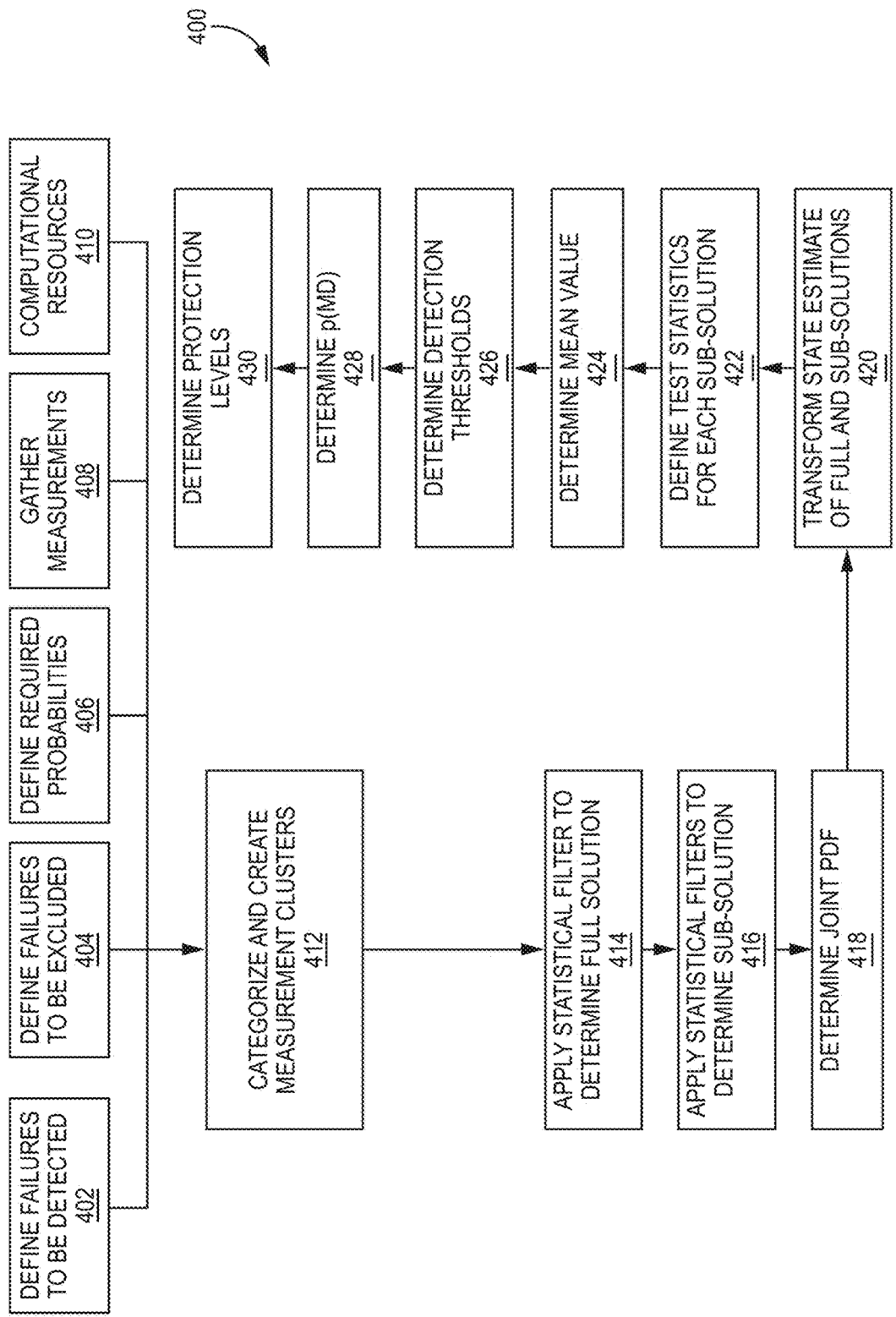
FIG. 4 illustrates an integrity monitoring flow diagram of an embodiment.

An integrity monitoring flow diagram 400 is illustrated in FIG. 4. The integrity monitoring flow diagram 400 shows a series of steps (402) through (430). The steps are shown in a particular order, one or more steps may be in a different order in other embodiments. The process starts be defining failures to be detected (402), failures to be excluded (404) and defining the required probabilities (406) of hazardously misleading information (HMI) and false alert (FA) (p(HMI) and P(FA)). These definitions along with, gathered available measurements (408) and computational resources (410) are used to categorize and create measurement clusters (412) into information domains, integrity monitoring classes, aiding classes and sections (including specification of the measurement devices properties—noise prop., failure prob.). The $M_C$ measurement clusters are then created $C_1, \ldots, C_M$ with properties:

a. $C_i \neq C_j$, $i \neq j$, $i,j=1, \ldots, M_C$
 b. $C_i \cap C_j$ (may or may not be an empty set)
 c. $S = C_1 \cup C_2 \cup C_j \cup \ldots \cup C_M$ $M_V$ virtual clusters (if applied) may also be created. The simplest possibility is to design the clusters according to failures to be detected. A statistical filter estimating the navigation information (i.e. state) at time k, further denoted $x_k$, based on the mathematical model and all available measurements in S up to time k, further denoted as $Z_k^S$ (414). The filter, further denoted as the full-solution, provides a conditional state estimate in form of the probability density function (PDF) at time k denoted as:

$$x_k^S \triangleq x_k \sim p(x_k | Z_k^S)$$

An example of the statistical filters that may be used is an extended Kalman filter or a particle filter. Navigation information may be for example composed of 3 position, 3 velocity, and 3 attitude/heading elements.

A set of statistical filters estimating the navigation information based on the mathematical model and measurements from all but one clusters denoted is applied at step (416) to determined sub-solutions. This is further denoted as $Z_k^{Sm}$, where:

$$S_m = C_1 \cup \ldots \cup C_{m-1} \cup C_{M+1} \cup \ldots \cup C_M, m = 1, \ldots, M, M = M_c + M_V$$

A filter, further denoted as the sub-solution, provides state estimate of the form:

$$x_k^{Sm} \triangleq x_k \sim p(x_k | Z_k^{Sm})$$

Note that the sub-solutions are created for both measurement and virtual clusters, i.e. $M=M_C+M_V$ sub-solutions is defined.

In addition to the full-solution and sub-solutions, a joint PDF is determined (418). The joint PDF is represented by:

$$p(x_k^S, x_k^{S1}, \ldots, x_k^{SM})$$

For the estimated state, the joint PDF characterizes also the correlation between the full-solution and all sub-solutions and sub-sub-solutions related to the measurement and virtual clusters (if any). The joint PDF can be computed either by a stand-alone algorithm or from the conditional PDFs of the full-solution and sub-solutions. The former approach is represented, for example, by the idea of cross-covariance propagator introduced in Brenner, M.: "Integrated GPS/Inertial Fault Detection Availability," NAVIGATION: Journal of The Institute of Navigation, vol. 43, no. 2, 1996 and the latter by the approach proposed in Young, S. Y. R. and McGraw, G. A.: "Fault Detection and Exclusion Using Normalized Solution Separation and Residual Monitoring Methods," NAVIGATION: Journal of the Institute of Navigation, vol. 50, no. 3, pp 151-169, 2003, where the cross-covariance matrices are computed on the basis of covariance matrices of the full-solution and sub-solutions.

The state estimate of the full-solution and all sub-solutions is transformed from the information domains (in which the statistical filters are working) to integrity monitoring classes (in which the integrity monitoring is working) (420). Transformation is, generally a nonlinear transformation of the estimated PDF according to:

$$Y_k^S = f(x_k^S)$$

$$y_k^{Sm} = f(x_k^{Sm}), m=1, \ldots, M$$

where f(.) is the known vector function, which results in:

$$y_k^S \triangleq y_k \sim p(y_k|Z_k^S)$$

$$y_k^{Sm} \triangleq y_k \sim p(y_k|Z_k^{Sm})$$

As an example, transformation of the horizontal position described by two coordinates $p_x$ and $p_y$, which are part of the state and thus estimated by the statistical filter, into the horizontal range '$r=f(p_x, p_y)=\text{sqrt}(p_x^2+p_y^2)$', which is further assessed by the integrity monitoring algorithm.

The joint PDF is nonlinearly transformed as well, i.e. the PDF as represented as:

$$p(y_k^S, y_k^{S1}, \ldots, y_k^{SM}) \quad (1)$$

is computed. As mentioned above, the statistical filter state is defined in the information domain (e.g., 3 position, 3 velocity, and 3 attitude/heading elements, 9 elements in total), but for the integrity monitoring algorithm different variables (e.g., the horizontal and vertical position, horizontal and vertical velocity, and attitude/heading) are considered. These quantities define the integrity monitoring classes.

The steps continue with defining test statistics for sub-solution (422). The defined statistics for a sub-solution is defined as:

$$d_{m,k} = y_k^{Sm} - y_k^S, m=1, \ldots, M$$

of which PDF $p(d_{m,k})$ can be computed using a convolution of known PDFs of:

$$y_k^{Sm} \text{ and } y_k^S$$

on the basis of the PDF (1). Thus, the PDF $$p(d_k) = p(d_{1,k}, d_{2,k}, \ldots, d_{M,k}) \quad (2)$$

is known.

The mean value of the test statistics is determined as in step (424):

$$\hat{d}_{m,k} = \hat{y}_k^{Sm} - \hat{y}_k^S, m=1, \ldots, M$$

where $\hat{y}_k^{Sm}$ stands for the mean of $\hat{y}_{k|k}^{Sm}$, i.e., for $\hat{y}_k^{Sm} = E[y_k^{Sm}]$.

Detection thresholds $D_{m,k}$ are determined (426) for each statistics fulfilling the equality:

$$\bar{p}(FA) = (1-p(FA)) = P(|d_{1,k}|<D_{1,k}|d_{2,k}|<D_{2,k}, \ldots, |d_{M,k}|<D_{M,k}) \quad (3)$$

where |d| stands for the absolute value of each element of vector d. If d is a vector then the notation d<D means that each element of the vector d fulfils the inequality.

The thresholds can be computed by the solution to the following integral relation in step (428):

$$\bar{p}(FA) = \int_{hyperrectangle} p(d_k)dd_k \quad (4)$$

meaning integration of the PDF of variable:

$$d_k = [d_{1,k}^T, d_{2,k}^T, \ldots, d_{M,k}^T]^T$$

over hyperrectangle with edge lengths defined by the thresholds:

$$D_k = [D_{1,k}^T, D_{2,k}^T, \ldots, D_{M,k}^T]^T$$

Integration is based on the joint PDF $p(d_k)$ (2). There exist indefinitely many hyperrectagles which fulfil the equation (3) and the integral equation (4) for:

$$\bar{p}(FA)$$

In different embodiments, from all these, thresholds $D_k$ can be selected based on:
(1) Distributing p(FA) budget among the integrity monitoring classes in predefined ratio (e.g., 15% allocated for vertical/horizontal position, vertical/horizontal velocity, roll, and pitch and 10% for heading), and
(2) Optimizing user-defined criterion(s), for example: (a) Minimum vertical position protection level and (b) Minimum volume of the hyperrectangle or a hyperrectangle defined by a subset of $D_k$.

Except very special cases, the solution to the definite integral relation (3) is numerical. A straightforward solution to (3) can be based on numerical solution to the relation $$\bar{p}(FA) = \sum_{m=1}^{M} \bar{p}_m(FA) - \text{corr}$$

where corr stands for the terms considering mutual correlation between particular terms $d_m$. The correlation term is a function of union probabilities, i.e., of $$P(-D_m < d_m < D_m \cup \ldots \cup -D_n < d_n < D_n), \forall m,n, m \neq n$$

which are, however, unknown. Evaluation of the correlation term may require a too computationally demanding numerical solution. In the following, therefore, two numerically efficient algorithms for computation of the hyperrectangle edges $D_k$ to fulfil (3) under assumption of the Gaussian joint PDF (2) are proposed (for the sake of simplicity, the time index k is omitted).

Algorithm 1:
1) The given probability $\bar{p}(FA)$ is to be distributed among the test statistics $d_m$, where m=1, ..., M, and the probability related to $d_m$ is denoted as $\bar{p}_m(FA)$. The partial probability $p_m(FA)$ can be further written as $$\bar{p}_m(FA) = P(|d_m| < D_m) = P(-D_m < d_m < D_m)$$

Considering correlated statistics $d_m$ and unknown correlation term corr, the total budget is initially distributed (according to user preferences) so that $$\bar{p}(FA) = \sum_{m=1}^{M} \bar{p}_m^{req}(FA).$$

The probability is, thus, distributed under assumption of uncorrelated test statistics and the neglected and unknown correlation corn is compensated by the following steps.

2) Based on the set of partial probabilities and Gaussianity assumption, upper bound thresholds $D_m^{up}$ are computed so that $$\bar{p}_m^{req}(FA) = P(-D_m^{up} < d_m < D_m^{up}) \forall m$$

The computation can be performed using cumulative distribution function (CDF) of the Gaussian PDF given the moments of the PDF $p(d_m)$ computed on the basis of full-solution and sub-solutions.

3) The upper bound thresholds $D_m^{up}$ defines a region where the thresholds respecting the correlation, i.e, $D_m$ should be searched. Using an optimization approach, the thresholds $D_m$ are computed to fulfil $$\bar{p}(FA) = (1-p(FA)) = P(|d_{1,k}| < D_{1,k}, |d_{2,k}| < D_{2,k}, \ldots, |d_{M,k}| < D_{M,k}) \quad (5)$$

subject to $$\sum_{m=1}^{M} (\bar{p}_m^{req}(FA) - \bar{p}_m(FA))^2 \to \min \quad (6)$$

where $\bar{p}_m(FA) = P(-D_m < d_m < D_m)$, $\forall m$

A simple numerical solution to the optimization is based on specification of several candidate thresholds $D_{m,(i)}$, $\forall m$, where i=1,2, . . . , and evaluation of (5) with respect to (6) and given $\bar{p}(FA)$. Eq. (5) can be evaluated on the basis of a technique given in Genz, A.: "Numerical Computation of Multivariate Normal Probabilities," J. Comp. Graph Stat 1, pp. 141-149, 1992, and standard results of CDF properties. The candidate thresholds $D_{m,(i)}$ are selected on the basis of computed upper bound thresholds $D_m^{up}$.

Algorithm 2:
1) The joint probability (5) can be using the Bayes' rule written as follows $$\bar{p}(FA) = P(|d_{1,k}| < D_{1,k}, |d_{2,k}| < D_{2,k}, \ldots, |d_{M,k}| < D_{M,k})$$
$$= P(\delta_1, \delta_2, \ldots, \delta_M)$$
$$= P(\delta_1 | \delta_2, \ldots, \delta_M) \times \ldots \times P(\delta_{M-1} | \delta_M) P(\delta_M)$$

where the notation $P(\delta_m | \delta_n)$ stands for the conditional probability of $\delta_m$ conditioned by $\delta_n$.

Having given the total budget $\bar{p}(FA)$, a set of particular values of the conditional probabilities, denoted as $\bar{\rho}_m(FA)$, can be constructed according to the user preferences so that $$\bar{p}(FA) = \bar{\rho}_1(FA) \bar{\rho}_2(FA) \times \ldots \times \bar{\rho}_M(FA)$$

2) Having the probability $\bar{\rho}(FA)$ and assuming Gaussian distribution of $p(d_M)$, detection threshold $D_M$ can be computed to fulfill $$\bar{p}_M(FA) = P(|d_M| < D_M) = P(-D_M < d_M < D_M)$$

using CDF of a Gaussian distribution.

3) Having the probabilities $\bar{\rho}_{M-1}(FA)$, $\bar{\rho}_M(FA)$, the joint probability $$P(-D_{M-1} < d_{M-1} < D_{M-1}, -D_M < d_M < D_M) \quad (7)$$
$$= P(-D_{M-1} < d_{M-1} < D_{M-1} | -D_M < d_M < D_M) P(-D_M < d_m < D_M)$$
$$= \bar{\rho}_{M-1}(FA) \bar{\rho}_M(FA)$$

can be computed. As the threshold $D_M$ is already computed, the only unknown variable is $D_{M-1}$ which can be numerically computed using results given in Genz, 1992 as the joint PDF $p(d_{M-1}, d_M)$ can be computed from (2).

4) The algorithm analogously continues for all remaining conditional probabilities in (7).

Both algorithms represent a tool for computing detection thresholds while the test statistics are correlated. Note that Algorithm 1 performs one optimization over M-dimensional space, whereas Algorithm 2 performs M optimizations over one dimensional space.

Computed detection thresholds $D_m$, $\forall m$, are to be used for detection of a failure. A failure is detected and an alarm is raised if there exist at least one m that $$d_m \not\in \langle -D_m, D_m \rangle.$$

The probability of missed detection p(MD) for each measurement cluster and the respective error bounds $a_{m,k}$ is determined at step (428) for each sub-solution or sub-sub-solution (in case of virtual clusters). The computation requires solution to the following relations a. Total budget of p(HMI) can be written as:

$$p(HMI) = \sum_{m=1}^{M} p_m(CF) p_m(MD) + p_{rem}(HMI)$$

where $p_m(CF)$ is a priori probability of $m^{th}$ (measurement or virtual) cluster failure given by the probability of singe failure—p(SF) or probability of wide failure p(WF) related to measurement devices in the cluster, $p_m(MD)$ is required allowed probability of missed detection of the $m^{th}$ cluster, and $p_{rem}(HMI)$ is the allocation of the HMI budget which cannot be detected by the method (e.g., simultaneous failure of all clusters).

Error bounds $a_{m,k}$ are computed to fulfil the equality:

$$\bar{p}(MD) = (1 - p(MD)) = P((y_k - \hat{y}_k^{S1}) < a_{1,k}, (y_k - \hat{y}_k^{S2}) < a_{2,k}, \ldots, (y_k - \hat{y}_k^{SM}) < a_{M,k}) \quad (8)$$

where p(MD) is computed on the basis of partial probabilities $p_m(MD)$.

The solution to error bounds is, analogously to thresholds computation, typically numerical and versions of Algorithms 1 and 2 can be straightforwardly used. Contrary to threshold computation, where definite integral relation (2), the solution to the error bounds in (8) requires solution to an improper integral (lower limit is infinite).

The required protection levels for the whole navigation information (for all integrity monitoring classes) is determined at step (430) as:

$$PL_k = \max_{m=1,\ldots,M} \{D_{m,k} + \alpha_{m,k}\}$$

where the function max select maximum value for each element of the vector. Note a different function for PL computation can be selected.

The steps set out above describe detection of the failures in the clusters in an embodiment. If detection and exclusion is required, an additional layer needs to be created for each sub-solution. Mechanization of the additional level is analogous to the introduced steps, just the virtual clusters are not considered. In one embodiment, the concept of the fault detection and exclusion in the presented is analogous to the fault detection and exclusion in the solution separation.

An example, is herein provided to aid in the understanding of an embodiment. The example probability failures from the different navigation aiding sources 110 are summarized to include:

1. Measurement: Information domain; aiding class; aiding section; probability of single failure (p(SF)); probability of wide failure (p(WF))
2. True air speed: velocity; air data speed; true air speed; p(SF)=1e–4/hr; p(WF)=n/a —just a single measurement
3. Odometer speed: velocity; odometer speeds; one-wheel odometer speed; p(SF)=1e –5/hr; p(WF)=1e–9/hr
4. DME range: position; RF terrestrial ranging; DME range; p(SF)=1e–4/hr; p(WF)=1 e–7/hr
5. GPS pseudo-range: position; RF satellite ranging; GPS pseudo-range; p(SF)=1e–5/hr; p(WF)=1e–8/hr
6. Galileo pseudo-range: position; RF satellite ranging; Galileo pseudo-range; p(SF)=1e–4/hr; p(WF)=1e–6/hr The state of the full solution and the sub-solutions (i.e., the navigation information) include: 3-D position, 3-D velocity, attitude/heading. Integrity monitoring classes include: horizontal position, vertical position, horizontal velocity, vertical velocity, roll, pitch, & heading.

Integrated monitoring (IM) requirements in this example include:

1. p(HMI)=1e–7/hr, and
2. p(FA)=1e–5/hr

Figure 5:
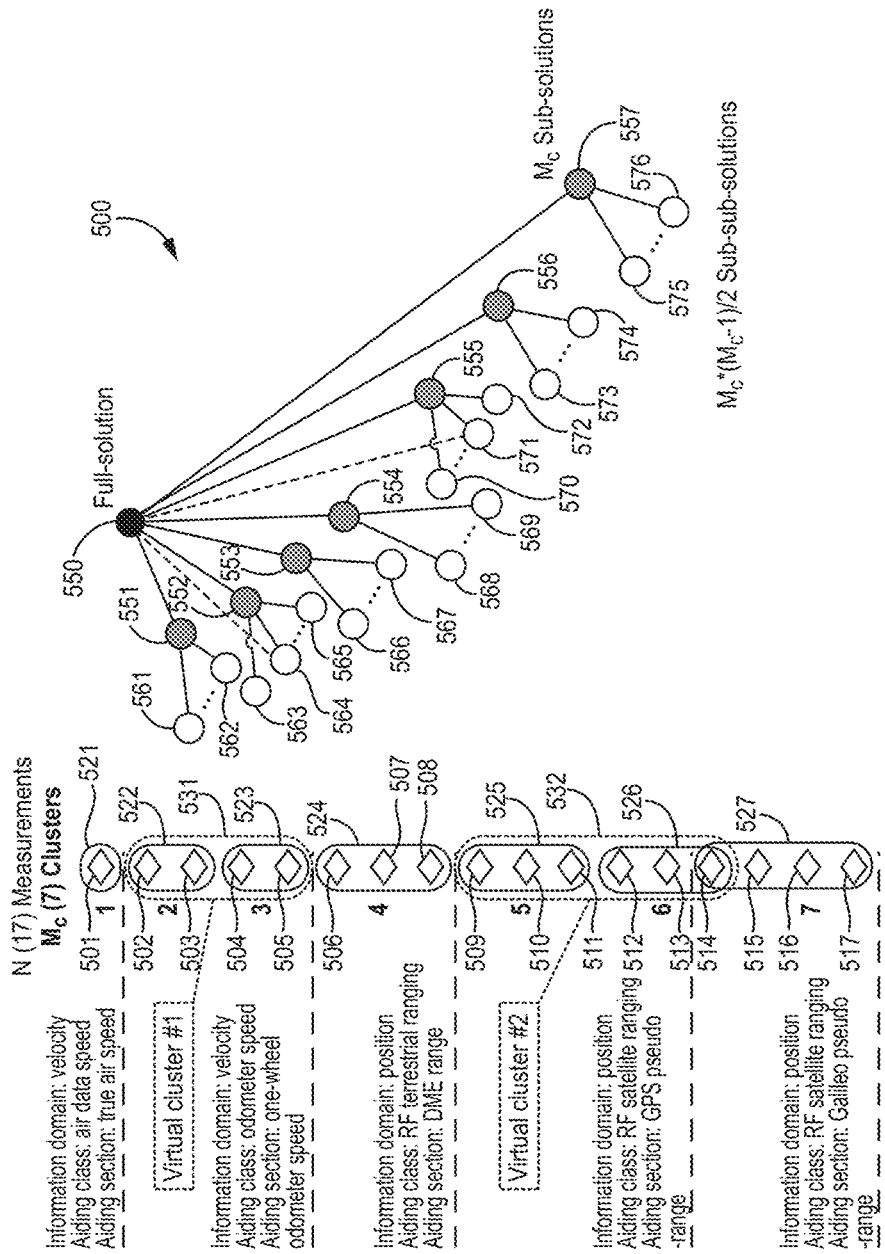
FIG. 5 illustrates an example solution formation of an embodiment.

Given the IM requirements and single and wide failure probabilities for each measurements, a following set of failures to be detected and excluded can be formed:

A. Failures to be excluded:
1. Single true air speed failure
2. Single odometer speed failures
3. Single DME range and wide DME failures
4. Single GPS and Galileo satellites failures
5. Wide Galileo failure
B. Failures to be detected:
6. All failure to be excluded
7. Wide odometer system failure
8. Wide GPS failure Referring to FIG. 5 the example provided above is illustrated in diagram 500. As illustrated, the example include seven different clusters formed from 17 different measurements 301 through 317 from the navigation aiding sources 110. A first cluster 521 is formed in an information domain; velocity, aiding class; air data speed and aiding section; true air speed. It includes one measurement 501. The second cluster 522 includes two measurements 502 and 503. The second cluster is in the information domain; velocity, aiding class; odometer speed, and aiding section, one-wheel odometer speed. The third cluster 523 includes measurements 504 and 505 and is also in the information domain; velocity, aiding class; odometer speed, and aiding section; one-wheel odometer speed. In this example, the second and third clusters 522 and 523 are further part of a first virtual cluster 531. In this embodiment, the first virtual cluster 531 enables detection of wide failure (failure of all measurements in this aiding section) of the odometer aiding. The fourth cluster 524 includes measurement 506, 507 and 508. They are in the information domain; position, aiding class; RF terrestrial ranging, and aiding section; DME range. The fifth cluster 525 includes measurement 509, 510 and 511. They are in the information domain; position, aiding class; RF satellite ranging, and aiding section; GPS pseudo-range. The sixth cluster 526 includes measurements 512 and 513. They are also in the information domain; position, aiding class; RF satellite ranging, and aiding section; GPS pseudo-range. Clusters 525 and 526 are further part of a second virtual cluster 532. The seventh cluster 527 includes measurements 514, 515, 516 and 517. They are in the information domain; position, aiding class; RF satellite ranging, and aiding section; Galileo pseudo-range. In this example, the second virtual cluster 532 also includes measurement 514 of the seventh cluster 527. The example formation 500 of FIG. 5, further illustrates a full-solution 550, seven sub-solutions 551 through 557 and 16 sub-sub-solutions 561 through 576. Sub-sub-solutions 564 and 571 are related to virtual cluster #1 and #2 as well.

EXAMPLE EMBODIMENTS

Example 1, includes an integrity monitoring method for navigation systems with heterogeneous measurements, the method includes defining integrity monitoring classes specifying quantities of a navigation information to be protected. Measurements from a plurality of different type navigation aiding sources are received. The measurements are categorized by an information domain, an aiding class and an aiding section. The information domain is a category of at least one of estimated states and measurements that represent a same physical category. The aiding class is a category that uses a same physical method to acquire measurements. The aiding section is a category of measurements from the same aiding source. The measurements are organized into a plurality of measurement clusters based at least in part on measurement fault modes to be detected, measurement fault modes to be excluded, available computer resources and required performance. An integrity monitoring algorithm is applied to the measurement clusters to determine an integrity solution for all defined integrity monitoring classes.

Example 2 includes the method of Example 1, further wherein all measurements formed into a cluster are from the same information domain, further wherein all clusters include measurements from at least one aiding class, further wherein at least one cluster includes measurements from at least a first aiding section and a second aiding section.

Example 3 includes any aspects of the Examples 1-2, wherein applying an integrity monitoring algorithm to the measurement clusters to determine an integrity solution for all defined integrity monitoring classes further includes, processing all measurements to determine a full navigation solution. A subset of all measurements is processed to determine a set of navigation sub-solutions. The subset has a selected structure within the measurement clusters. Mutual dependence of the full navigation solution and the set of sub navigation solutions is assessed. Faults detection and possibly exclusion functionality and computing protection levels of quantities of a navigation information specified in integrity monitoring classes is provided based at least in part on the basis of a full solution estimate, sub-solutions estimates, dependence among the solutions, and required probabilities of missed detection and false alert.

Example 4 includes any aspects of the Examples 1-3, further including estimating a joint probability function to characterizes a correlation between the full navigation solution and the navigation sub-solutions. The probability functions of the full solution estimate, the sub-solution and the joint probability function are transformed from an information domain into the integrity monitoring classes.

Example 5 includes any aspects of the Examples 1-4, further including defining test statistics for each sub-solution, determining a mean value of the test statistics and determining detection thresholds of the test statistics and performing detection of the faults.

Example 6 includes any aspects of the Examples 1-5, wherein the determination of the detected thresholds of the test statistics further includes distributing budget among the integrity monitoring classes in a predefined ratio and optimizing user-defined criteria.

Example 7 includes any aspects of the Examples 1-6, further including determining the probability of missed detection for each measurement cluster and determining respective error bounds for each sub-solution.

Example 8 includes any aspects of the Examples 1-8, further including creating an additional layer of solutions for each lowest layer solution when detection and exclusion is required.

Example 9, includes any aspects of the Examples 1-8, further including forming at least one virtual cluster to include exclusion capability, the at least one virtual cluster including at least two of the plurality of measurement clusters.

Example 10 includes a program product for implementing an integrity monitoring for navigation systems with heterogeneous measurements, the program product comprising a processor-readable medium on which program instructions are embodied, wherein the program instructions are operable, when executed by at least one processor in a navigation system, to cause the navigation system to; categorize received measurements from a plurality of different type navigation aiding sources by an information domain, an aiding class and an aiding section, wherein the information domain is a category of at least one of estimated states and measurements that represent a same physical category, wherein the aiding class is a category that uses a same physical method to acquire measurements, wherein the aiding section is a category of measurements from the same aiding source; organize the measurements into a plurality of measurement clusters based at least in part on measurement fault modes to be detected, measurement fault modes to be excluded, available computer resources and required performance; and apply an integrity monitoring algorithm to the measurement clusters to determine an integrity solution for all defined integrity monitoring classes.

Example 11 includes the aspects of the program product of Example 10, wherein all measurements formed into a cluster are from the same information domain, further wherein all clusters include measurements from at least one aiding class, further wherein at least one cluster includes measurements from at least a first aiding section and a second aiding section.

Example 12 includes any of the aspects of Examples 11-12, wherein the program instructions operable, when executed by the at least one processor, cause the navigation system to; process all measurements to determine a full navigation solution; process a subset of all measurements to determine a set of navigation sub-solutions, the subset having a selected structure within the measurement clusters; assess mutual dependence of the full navigation solution and the set of sub navigation solutions; and provide faults detection and possibly exclusion functionality and computing protection levels of quantities of a navigation information specified in integrity monitoring classes based at least in part on the basis of a full solution estimate, sub-solutions estimates, dependence among the solutions, and required probabilities of missed detection and false alert.

Example 13 includes a system having an integrity monitoring function for heterogeneous measurements, the system including at least one input, at least one memory and at least one controller. The at least one input receives navigation related measurement information from a plurality of different sources. The at least one memory is used to store at least one filter and at least one integrity function. The at least one controller is in communication with the at least one input and the at least one memory. The at least one controller is configured to execute the at least one filter and at least one integrity function in processing the received navigation related measurement information from the plurality of different sources to determine the integrity of the received navigation related measurement information. The controller, based on the execution of the at least one filter, is configured to categorize measurements from the navigation related measurement information by an information domain, an aiding class and an aiding section. The information domain is a category of at least one of estimated states and measurements that represent a same physical category. The aiding class is a category that uses a same physical method to acquire measurements. The aiding section is a category of measurements from the same aiding source. The at least one controller is further, based on the execution of the at least one filter, configured to organize the measurements into a plurality of measurement clusters based at least in part on measurement fault modes to be detected, measurement fault modes to be excluded, available computer resources and required performance. The at least one controller, based on the execution of the at least one integrity function, is configured to apply an integrity monitoring algorithm to the measurement clusters to determine an integrity solution for all defined integrity monitoring classes.

Example 14 is a system including the aspects of Example 13, wherein all measurements formed into a cluster are from the same information domain, further wherein all clusters include measurements from at least one aiding class, further wherein at least one cluster includes measurements from at least a first aiding section and a second aiding section.

Example 15 is a system including any of the aspects of Examples 13-14, wherein the at least one filter is configured to process all measurements to determine a full navigation solution, the at least one filter is further configured to process a subset of all measurements to determine a set of navigation sub-solutions, the subset having a selected structure within the measurement clusters, the at least one controller is further configured implement an algorithm to assess mutual dependence of the full navigation solution and the set of sub navigation solutions and provide faults detection and possibly exclusion functionality and computing protection levels of quantities of a navigation information specified in integrity monitoring classes based at least in part on the basis of a full solution estimate, sub-solutions estimates, dependence among the solutions, and required probabilities of missed detection and false alert.

Example 16 is a system including any of the aspects of Examples 13-15, further including a plurality of navigation related measurement sources to provide the navigation related measurement information.

Example 17 is a system including any of the aspects of Example 16, wherein the plurality of navigation related measurement sources includes at least two of an inertial measurement unit, a global navigation satellite receiver, a magnetometer, air-data, distance measurement equipment, eLoran, odometer, a radar-altimeter, a map and vision sensor.

Example 18 is a system including any of the aspects of Examples 13-17, further including a vehicle system in communication with the controller to receive the determined integrity solution.

Example 19 is a system including any of the aspects of Examples 13-18, wherein the vehicle system is a control system to control operations of vehicle based at least in part on the determined integrity solution.

Example 20 is a system including any of the aspects of Examples 13-18, wherein the vehicle system is at least one of a control system, a surveillance system, a display system and a management system.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A computer implement method implemented on a processor of integrity monitoring heterogeneous navigation information measurements for navigation systems, the method comprising:
receiving measurements from a plurality of different type navigation aiding sensors used for navigation of a vehicle;
categorizing the measurements into integrity monitoring classes by an information domain, an aiding class and an aiding section with a processor executing operating instructions in a memory, wherein the information domain is a category of at least measurements sorted in groups by physical quantity, wherein the aiding class is a category sorted in groups by physical methods used to acquire the measurements, wherein the aiding section is a category of measurements sorted in groups by navigation aiding sources providing the measurements;
organizing the measurements into a plurality of measurement clusters based at least in part on at least one of measurement fault modes to be detected with the processor, measurement fault modes to be excluded and available computer resources and for each integrity monitoring class as well as the categorization of the measurements by the information domain, the aiding class and the aiding section; and
applying an integrity monitoring algorithm to the measurement clusters to determine an integrity solution for all defined integrity monitoring classes with the processor, determining the integrity solution including,
processing all measurements by a statistical full-solution filter to determine a full navigation solution estimate,
processing all the measurements by a set of statistical sub-solution filters to determine a set of navigation sub-solution estimates, each statistical sub-solution filter generating an associated navigation sub-solution estimate using measurements from all but one measurement cluster of the plurality of measurement clusters,
assessing correlations between the full navigation solution estimate and the set of navigation sub-solution estimates; and
using the assessed correlations between the full navigation solution estimate and the set of navigation sub-solution estimates to provide at least one of fault detection and exclusion functionality.

2. The method of claim 1, further wherein all measurements formed into a measurement cluster are from the same information domain, further wherein all measurement clusters include measurements from at least one aiding class, further wherein at least one measurement cluster includes measurements from at least a first aiding section and a second aiding section.

3. The method of claim 1, further comprising:
estimating a joint probability function to characterize a correlation between the full navigation solution estimate and the navigation sub-solution estimates; and
transforming probability functions of the full solution navigation estimate, the navigation sub-solution estimates and the joint probability function from an information domain into the integrity monitoring classes.

4. The method of claim 3, further comprising:
defining test statistics for each navigation sub-solution estimate;
determining a mean value of the test statistics; and
determining detection thresholds of the test statistics and performing detection of faults.

5. The method of claim 4, further comprising:
determining the probability of missed detection for each measurement cluster; and
determining respective error bounds for each navigation sub-solution estimate.

6. The method of claim 1, wherein the required performance for each integrity monitoring class includes the required performance in terms of integrity, accuracy, availability and continuity.

7. The method of claim 1, further comprising:
creating an additional layer of navigation solution estimates for each lowest layer navigation sub-solution estimate when detection and exclusion is required.

8. The method of claim 1, further comprising:
forming at least one virtual cluster to include exclusion capability, the at least one virtual cluster including at least two of the plurality of measurement clusters.

9. A non-transitory computer readable storage medium for implementing an integrity monitoring of heterogeneous navigation measurements for navigation systems, the non-transitory computer readable medium comprising a processor-readable medium on which program instructions are embodied, wherein the program instructions are operable, when executed by at least one processor in a navigation system, to cause the navigation system to:
categorize received measurements from a plurality of different type navigation aiding sensors used for navigation of a vehicle into integrity monitoring classes by an information domain, an aiding class and an aiding section, wherein the information domain is a category of at least measurements sorted in groups by physical quantity, wherein the aiding class is a category sorted in groups by physical methods used to acquire the measurements, wherein the aiding section is a category of the measurements sorted in groups by navigation aiding sources providing the measurements;

organize the measurements into a plurality of measurement clusters based at least in part on at least one of measurement fault modes to be detected, measurement fault modes to be excluded and available computer resources for each integrity monitoring class as well as the categorization of the measurements by the information domain, the aiding class and the aiding section; and apply an integrity monitoring algorithm to the measurement clusters to determine an integrity solution for all defined integrity monitoring classes, determining the integrity solution including, process all measurements by a statistical full-solution filter to determine a full navigation solution estimate, process all the measurements by statistical sub-solution filters to determine a set of navigation sub-solution estimates, each statistical sub-solution filter generating an associated navigation sub-solution estimate using measurements from all but one measurement cluster of the plurality of measurement clusters, the subset having a selected structure within the measurement clusters, assess correlations between the full navigation solution estimate and the set of navigation sub-solution estimates, and using the assessed correlations between the full navigation solution estimate and the set of navigation sub-solution estimates to provide at least one of fault detection and exclusion functionality.

10. The program product of claim 9, wherein all measurements formed into a measurement cluster are from the same information domain, further wherein all measurement clusters include measurements from at least one aiding class, further wherein at least one measurement cluster includes measurements from at least a first aiding section and a second aiding section.

11. A system having an integrity monitoring function of heterogeneous navigation measurements, the system comprising:

at least one input to receive navigation related measurement information from a plurality of different sensors used for navigation of a vehicle;

at least one memory to store at least one statistical filter and at least one integrity function;

at least one processor in communication with the at least one input and the at least one memory, the at least one processor configured to execute the at least one filter and at least one integrity function in processing the received navigation related measurement information from the plurality of different sources to determine the integrity of the received navigation related measurement information, the at least one processor configured to categorize measurements from the navigation related measurement information into integrity monitoring classes by an information domain, an aiding class and an aiding section, wherein the information domain is a category of at least measurements sorted in groups by physical quantity, wherein the aiding class is a category sorted in groups by physical methods used to acquire the measurements, wherein the aiding section is a category of measurements sorted in groups by navigation aiding sources proving the measurements, the at least one processor further configured to organize the measurements into a plurality of measurement clusters based at least in part on measurement fault modes to be detected, measurement fault modes to be excluded and available computer resources as well as the categorization of the measurements by the information domain, the aiding class and the aiding section, the at least one processor based on the execution of the at least one integrity function configured to apply an integrity monitoring algorithm to the measurement clusters to determine an integrity solution for all defined integrity monitoring classes, wherein determining the integrity solution includes, the at least one statistical filter including a full-solution filter configured to process all measurements to determine a full navigation solution estimate, the at least one statistical filter further including a sub-solution filter configured to process all measurements to determine a set of navigation sub-solution estimates, each sub-solution filter generating an associated navigation sub-solution estimate using measurements from all measurement clusters but one measurement cluster from the plurality of measurement clusters, the at least one processor is further configured to implement an algorithm to assess correlations between the full navigation solution and the set of sub navigation solutions and use the assessed correlations between the full navigation solution estimate and the set of navigation sub-solution estimates to provide at least one of fault detection and exclusion functionality.

12. The system of claim 11, wherein all measurements formed into a measurement cluster are from the same information domain, further wherein all measurement clusters include measurements from at least one aiding class, further wherein at least one cluster includes measurements from at least a first aiding section and a second aiding section.

13. The system of claim 11, further comprising:
a plurality of navigation sensors to provide the navigation related measurement information.

14. The system of claim 13, wherein the plurality of navigation sensors includes at least two of an inertial measurement unit, a global navigation satellite receiver, a magnetometer, air-data, distance measurement equipment, eLoran, odometer, a radar-altimeter, a map and vision sensor.

15. The system of claim 11, further comprising:
a vehicle system in communication with the at least one processor to receive the determined integrity solution.

16. The system of claim 15, wherein the vehicle system is a vehicle control to control operations of vehicle based at least in part on the determined integrity solution.

17. The system of claim 15, wherein the vehicle system is at least one of a control system, a surveillance system, a display system and a management system.

* * * * *